(12) United States Patent
Chung et al.

(10) Patent No.: US 11,162,395 B2
(45) Date of Patent: Nov. 2, 2021

(54) CAMSHAFT PHASERS FOR CONCENTRICALLY ARRANGED CAMSHAFTS

(71) Applicant: Schaeffler Technologies AG & Co. KG, Herzogenaurach (DE)

(72) Inventors: Inhwa Chung, Lasalle (CA); Jeffrey Mossberg, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 523 days.

(21) Appl. No.: 16/200,705

(22) Filed: Nov. 27, 2018

(65) Prior Publication Data

US 2019/0170165 A1 Jun. 6, 2019

Related U.S. Application Data

(60) Provisional application No. 62/593,823, filed on Dec. 1, 2017.

(51) Int. Cl.
*F01L 1/34* (2006.01)
*F01L 1/344* (2006.01)
(Continued)

(52) U.S. Cl.
CPC .............. *F01L 1/344* (2013.01); *F01L 1/3442* (2013.01); *F01L 1/352* (2013.01); *F15B 15/12* (2013.01);
(Continued)

(58) Field of Classification Search
CPC ......... F01L 1/344; F01L 1/352; F01L 1/3442; F01L 2001/34493; F01L 2820/041; F01L 2250/02; F01L 2820/032; F01L 2810/02; F01L 2001/3521; F01L 2001/0473; F15B 15/12; F15B 15/20; F15B 15/088; F15B 2015/206; F16H 53/04; F16H 49/001
See application file for complete search history.

(56) References Cited

U.S. PATENT DOCUMENTS 9,249,695 B2 2/2016 Burke et al.
2010/0093453 A1* 4/2010 Myers .................. F01L 1/3442
464/160

FOREIGN PATENT DOCUMENTS

DE 102016204426 A1 9/2017
WO 2009067789 A1 6/2009
WO 2017042302 A1 3/2017

* cited by examiner

Primary Examiner — Zelalem Eshete

(57) ABSTRACT

A camshaft phaser assembly, including: an axis of rotation; a hydraulic camshaft phaser including a stator arranged to receive rotational torque and including a plurality of radially inwardly extending protrusions, a rotor arranged to be non-rotatably connected to a first camshaft and including a plurality of radially outwardly extending protrusions circumferentially interleaved with the plurality of radially inwardly extending protrusions, and a plurality of chambers bounded at least in part by the plurality of radially inwardly extending protrusions and the plurality of radially outwardly extending protrusions; an electric camshaft phaser including an output gear arranged to be non-rotatably connected to a second camshaft located concentrically within the first camshaft and an input non-rotatably connected to the stator; and a connection plate non-rotatably connecting the input and the stator. The rotor and the output gear are rotatable with respect to each other about the axis of rotation.

20 Claims, 8 Drawing Sheets

(51) Int. Cl.
*F15B 15/12* (2006.01)
*F15B 15/20* (2006.01)
*F16H 53/04* (2006.01)
*F16H 49/00* (2006.01)
*F01L 1/352* (2006.01)
*F15B 15/08* (2006.01)

(52) U.S. Cl.
CPC ........... *F15B 15/20* (2013.01); *F16H 49/001* (2013.01); *F16H 53/04* (2013.01); *F01L 2001/34493* (2013.01); *F15B 15/088* (2013.01); *F15B 2015/206* (2013.01)

CAMSHAFT PHASERS FOR CONCENTRICALLY ARRANGED CAMSHAFTS

CROSS-REFERENCE TO RELATED APPLICATIONS

This application claims the benefit under 35 U.S.C. § 119(e) of U.S. Provisional Patent Application No. 62/593,823, filed Dec. 1, 2017, which application is incorporated herein by reference in its entirety.

TECHNICAL FIELD

This disclosure is generally related to camshaft phasers, and, more particularly, to a camshaft phaser assembly including a hydraulic camshaft phaser and an electric camshaft phaser.

BACKGROUND

It is known to combine two hydraulic camshaft phasers to control phasing of two concentric camshafts. Hydraulic fluid is provided under pressure to the two hydraulic camshaft phasers to implement the phasing. To maintain the proper fluid pressure to the hydraulic camshaft phaser furthest from the source of the hydraulic fluid, the size or speed of the pump for the hydraulic fluid must be increased, which increases the size or the energy budget of the system including the two hydraulic camshaft phasers.

SUMMARY

According to aspects illustrated herein, there is provided a camshaft phaser assembly, including: an axis of rotation; a hydraulic camshaft phaser including a stator arranged to receive rotational torque and including a plurality of radially inwardly extending protrusions, a rotor arranged to be non-rotatably connected to a first camshaft and including a plurality of radially outwardly extending protrusions circumferentially interleaved with the plurality of radially inwardly extending protrusions, and a plurality of chambers bounded at least in part by the plurality of radially inwardly extending protrusions and the plurality of radially outwardly extending protrusions; an electric camshaft phaser including an output gear arranged to be non-rotatably connected to a second camshaft located concentrically within the first camshaft and an input non-rotatably connected to the stator; and a connection plate non-rotatably connecting the input and the stator. The rotor and the output gear are rotatable with respect to each other about the axis of rotation.

According to aspects illustrated herein, there is provided a camshaft phaser assembly, including: an axis of rotation; a hydraulic camshaft phaser including a stator arranged to receive rotational torque and including a plurality of radially inwardly extending protrusions, a rotor including a plurality of radially outwardly extending protrusions circumferentially interleaved with the plurality of radially inwardly extending protrusions, and a plurality of chambers bounded at least in part by the plurality of radially inwardly extending protrusions and the plurality of radially outwardly extending protrusions; an electric camshaft phaser including an output gear and an input including a notch; a first bolt arranged to non-rotatably connect the rotor to a first camshaft; a second bolt arranged to non-rotatably connect the output gear to a second camshaft, the second camshaft concentric with the first camshaft; and a connection plate including an annular body portion fixedly secured to the stator, a central opening bounded by the annular body portion and through which the axis of rotation passes, and a protrusion extending from the annular body portion in an axial direction and including a portion disposed in the notch. The rotor and the output gear are rotatable with respect to each other about the axis of rotation.

According to aspects illustrated herein, there is provided a camshaft phaser assembly, including: an axis of rotation; a hydraulic camshaft phaser including a stator arranged to receive rotational torque and including a plurality of radially inwardly extending protrusions, a rotor including a plurality of radially outwardly extending protrusions circumferentially interleaved with the plurality of radially inwardly extending protrusions, and a plurality of chambers bounded at least in part by the plurality of radially inwardly extending protrusions and the plurality of radially outwardly extending protrusions; an electric camshaft phaser including an output gear and an input; a first bolt arranged to non-rotatably connect the rotor to a first camshaft; a second bolt arranged to non-rotatably connect the output gear to a second camshaft, the second camshaft concentric with the first camshaft; a connection plate non-rotatably connected to the stator and to the input; a first channel bounded at least in part by the first bolt and the rotor and in fluid communication with a chamber included in the plurality of chambers; and a second channel bounded at least in part by the second bolt, in fluid communication with the electric camshaft phaser, and extending past the first channel in a first axial direction and a second axial direction opposite the first axial direction. The rotor and the output gear are rotatable with respect to each other about the axis of rotation.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
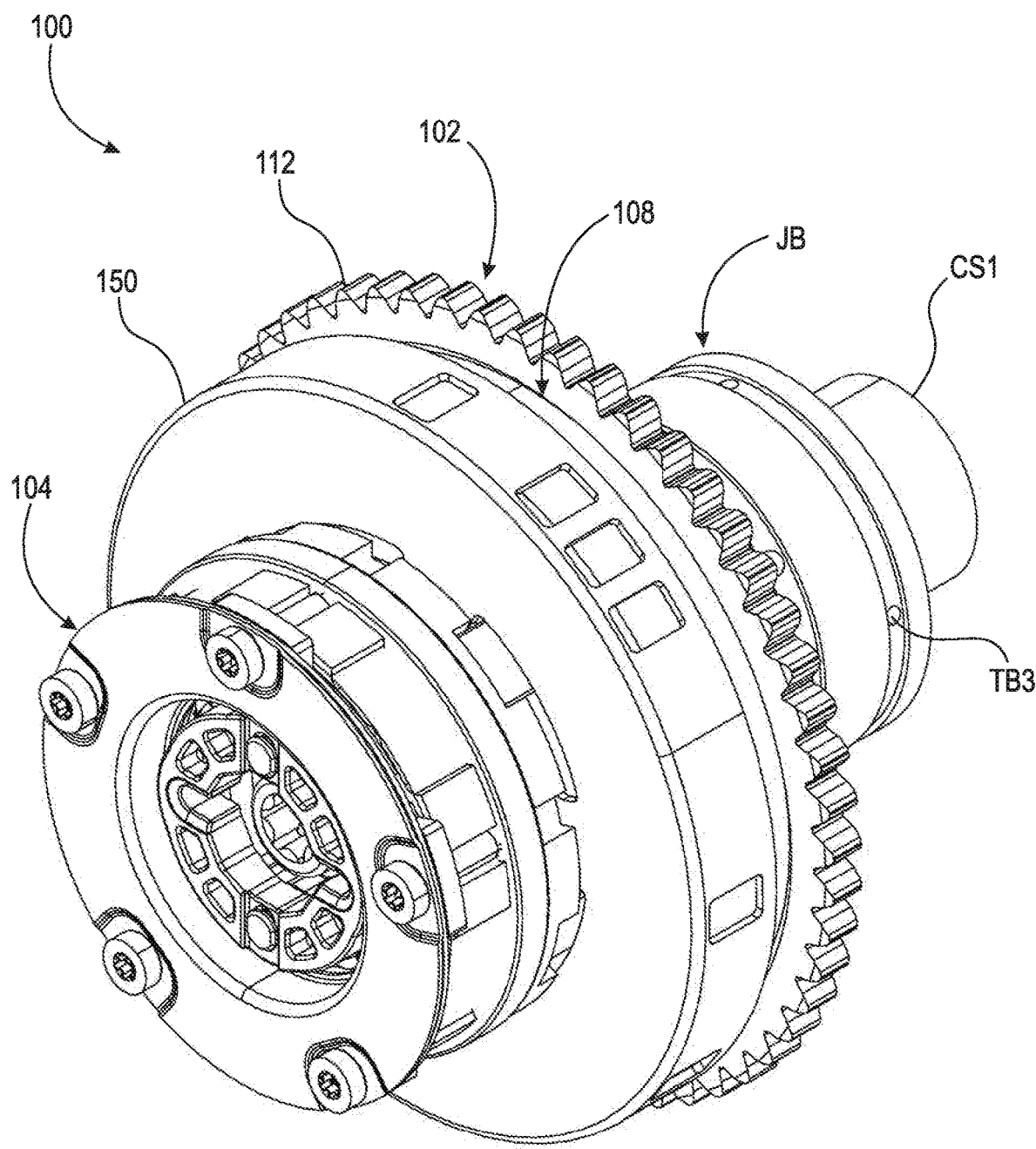
FIG. 1 is a perspective front view of a dual camshaft phasesassembly with a hydraulic camshaft phaser and an electric camshaft phaser.

FIG. 1 is a perspective front view of dual camshaft phaser assembly 100 with a hydraulic camshaft phaser and an electric camshaft phaser.

Figure 2:
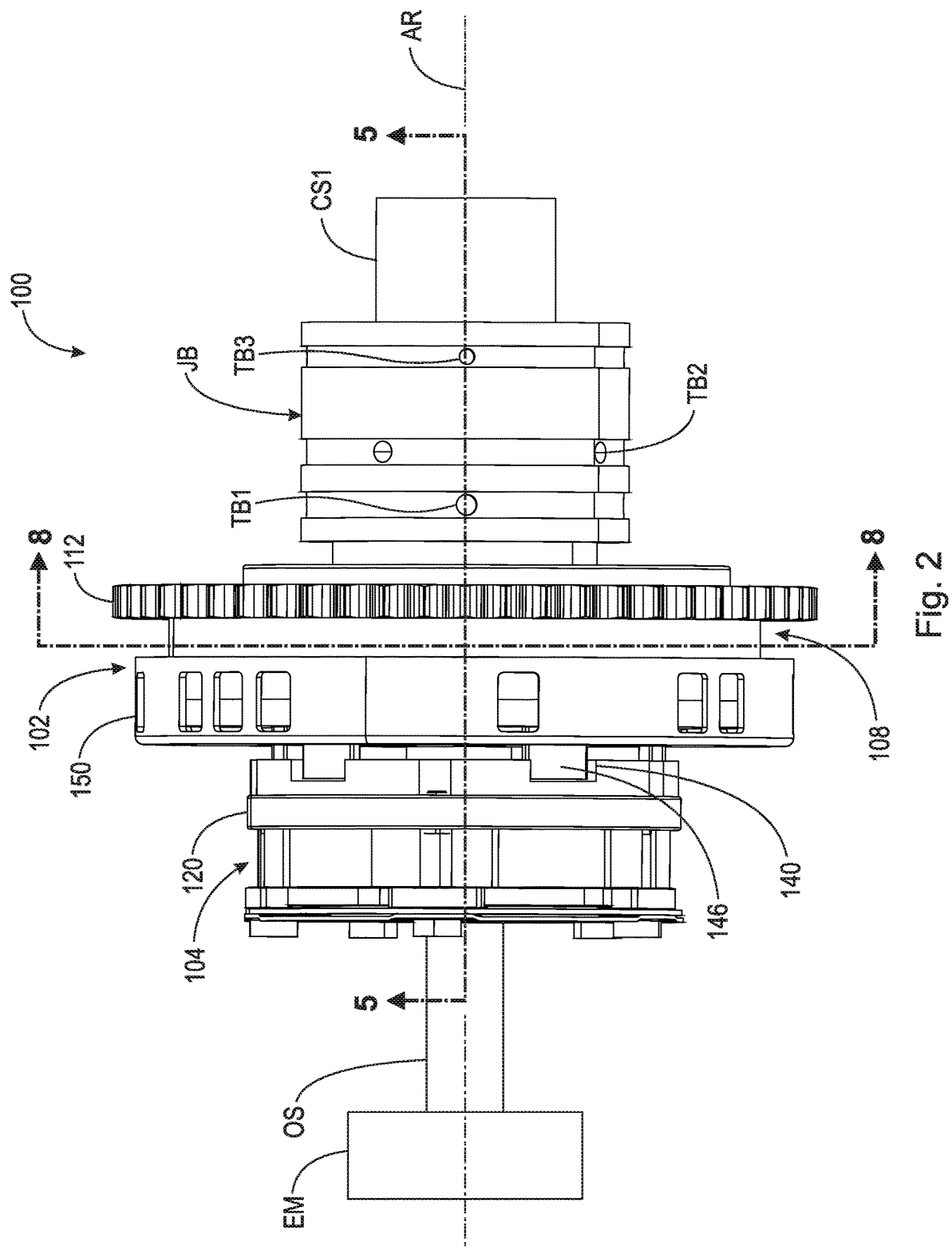
FIG. 2 is a side view of the dual camshaft phaser assembly shown in FIG. 1.

FIG. 2 is a side view of dual camshaft phaser assembly 100 assembly shown in FIG. 1.

Figure 3:
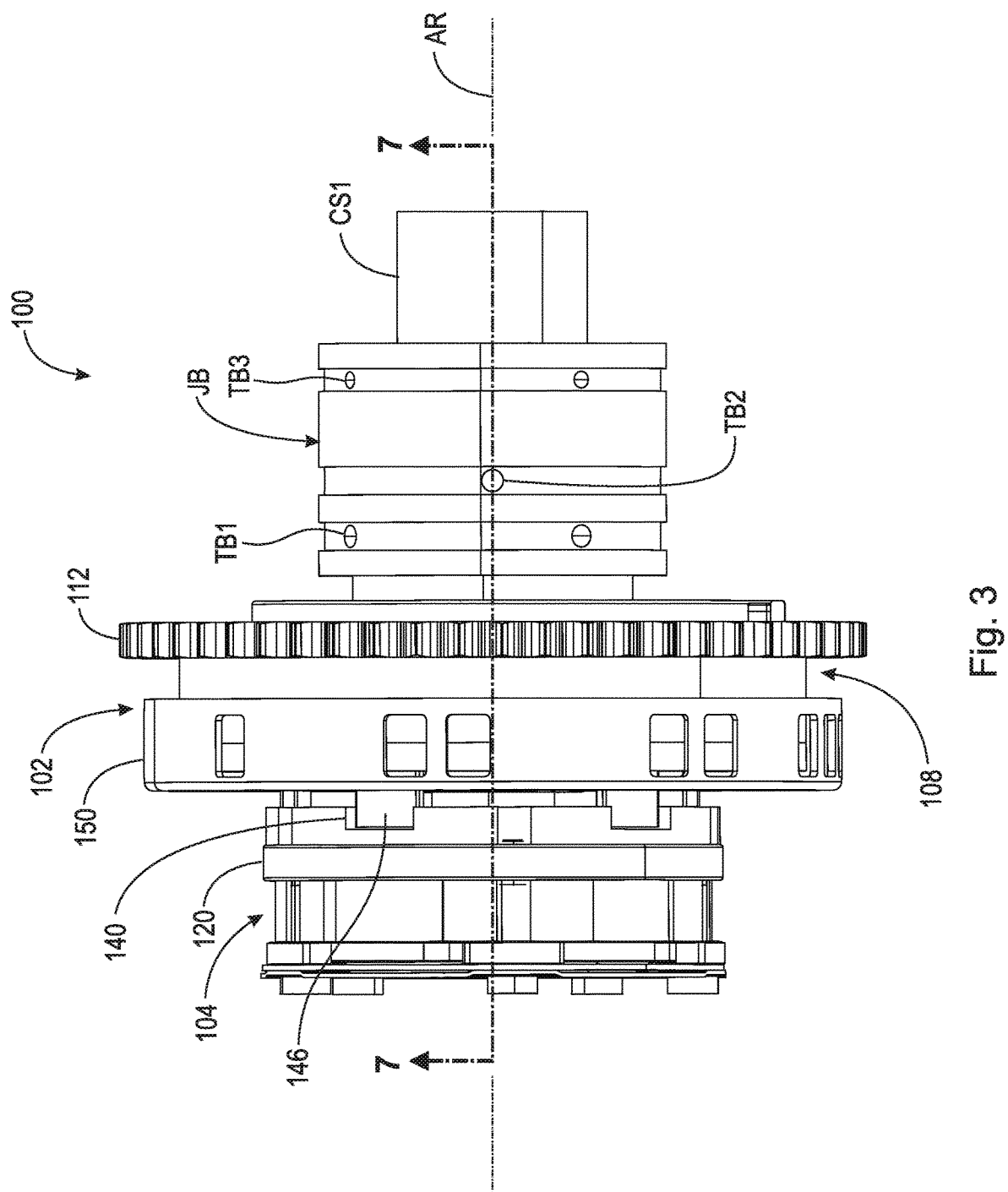
FIG. 3 is a side view of the dual camshaft phaser assembly shown in FIG. 1.

FIG. 3 is a side view of dual camshaft phaser assembly 100 assembly shown in FIG. 1.

Figure 4:
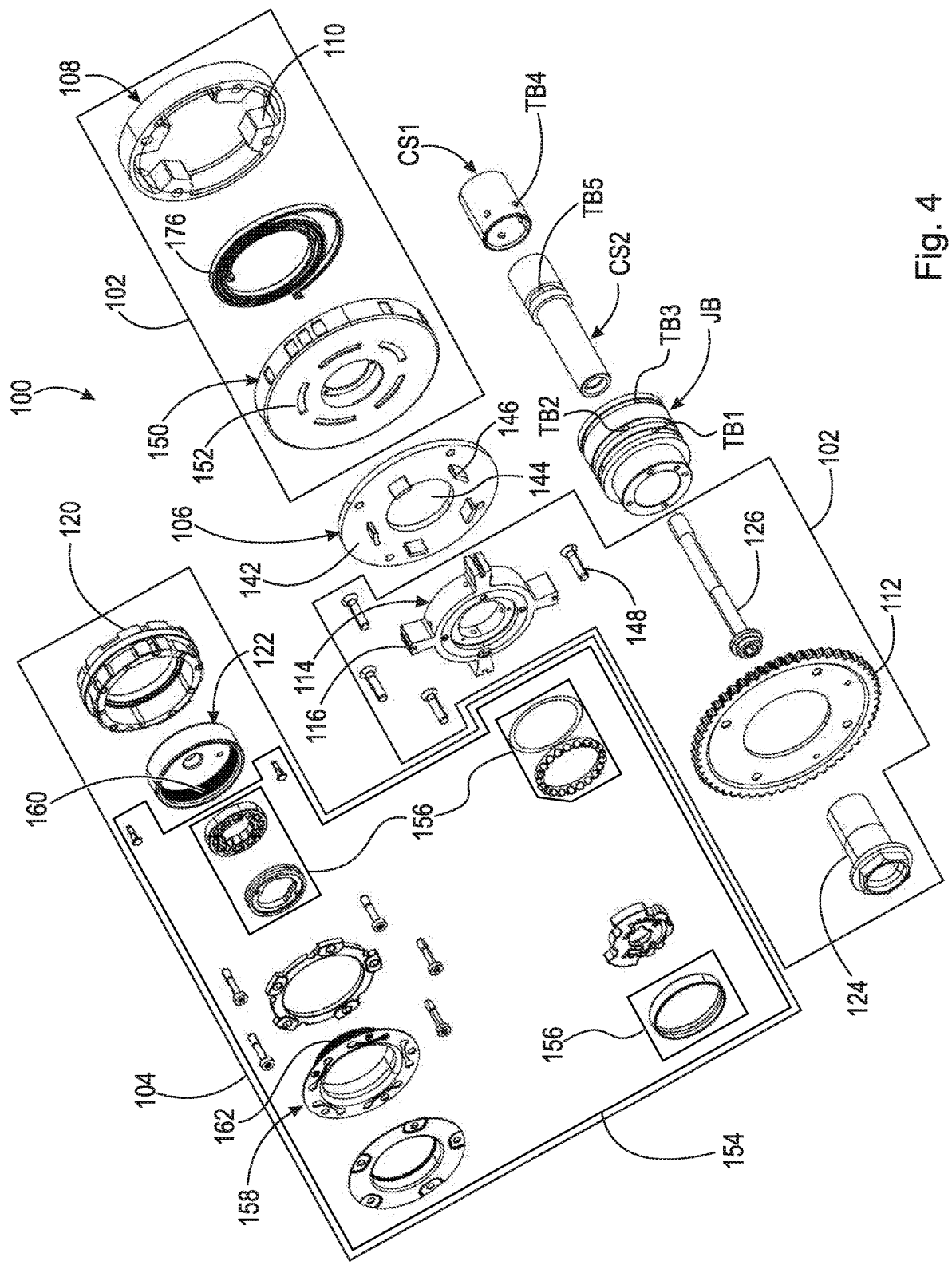
FIG. 4 is a exploded front view of the dual camshaft phaser assembly shown in FIG. 1.
Figure 5:
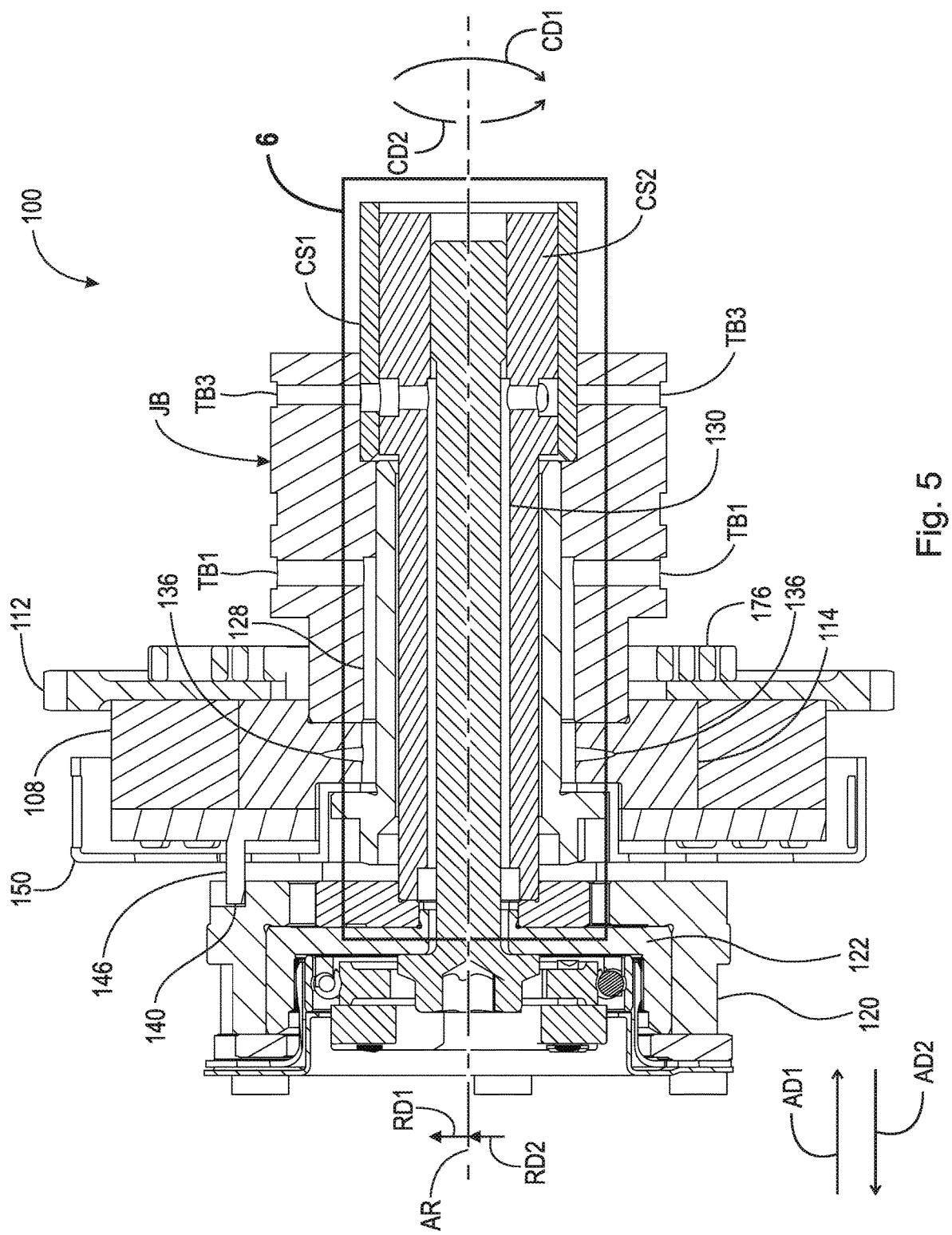
FIG. 5 is a cross-sectional view generally along line 5-5 in FIG. 2.

FIG. 4 is a exploded front view of dual camshaft phaser assembly 100 shown in FIG. 1;

FIG. 5 is a cross-sectional view generally along line 5-5 in FIG. 2.

Figure 6:
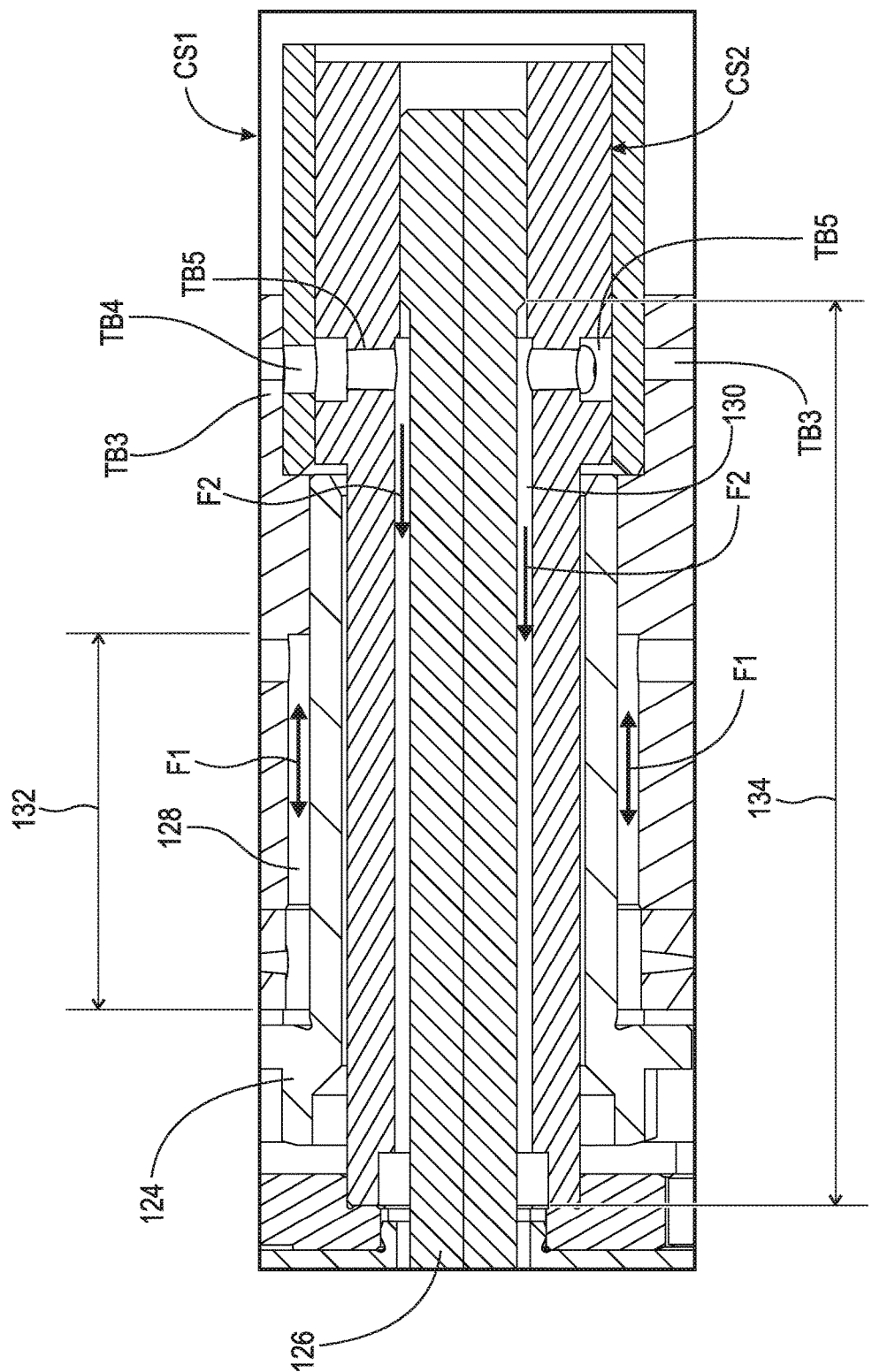
FIG. 6 is a detail of area 6 in FIG. 5.

FIG. 6 is a detail of area 6 in FIG. 5.

Figure 7:
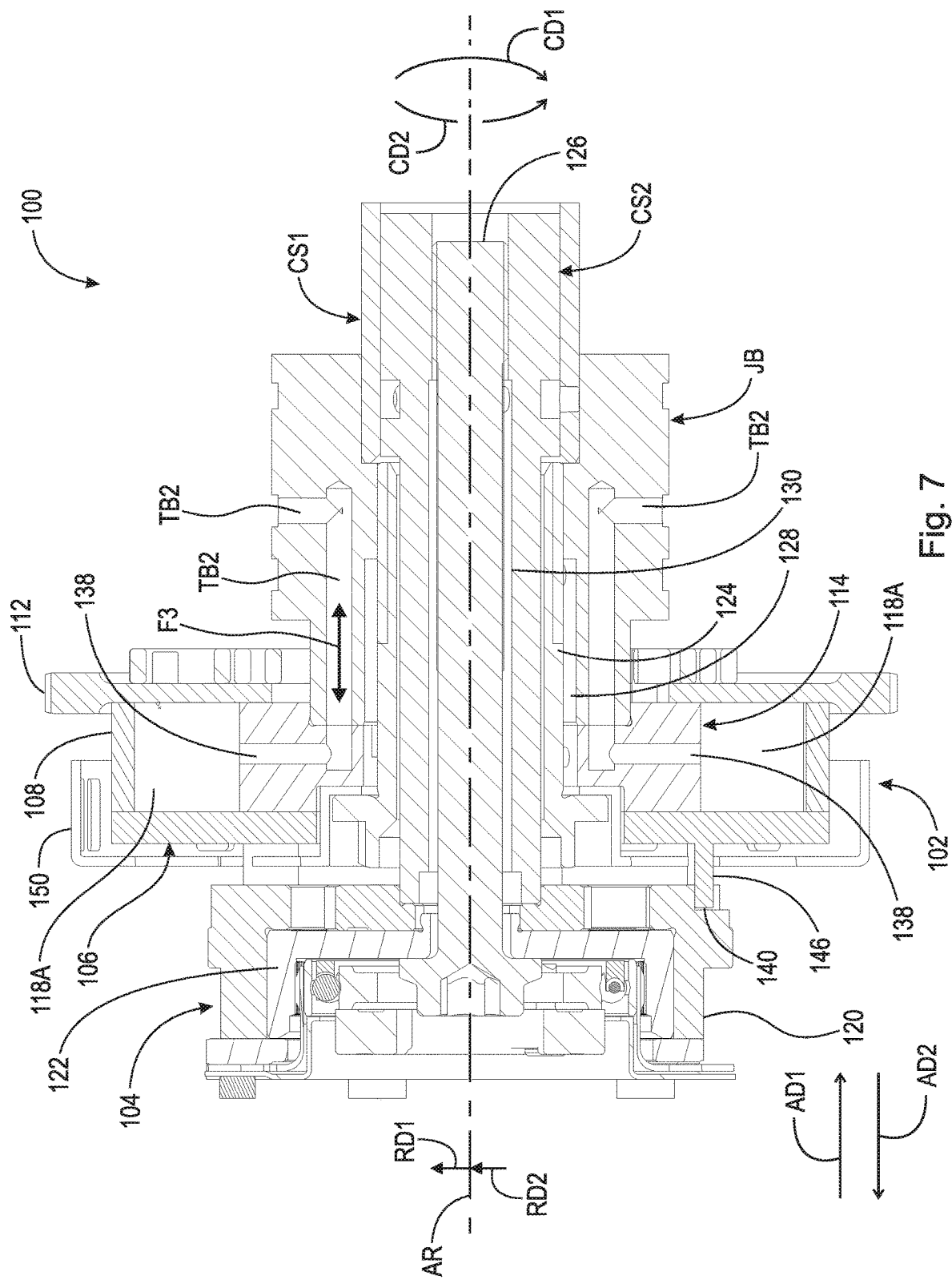
FIG. 7 is a cross-sectional view generally along line 7-7 in FIG. 3.

FIG. 7 is a cross-sectional view generally along line 7-7 in FIG. 3.

Figure 8:
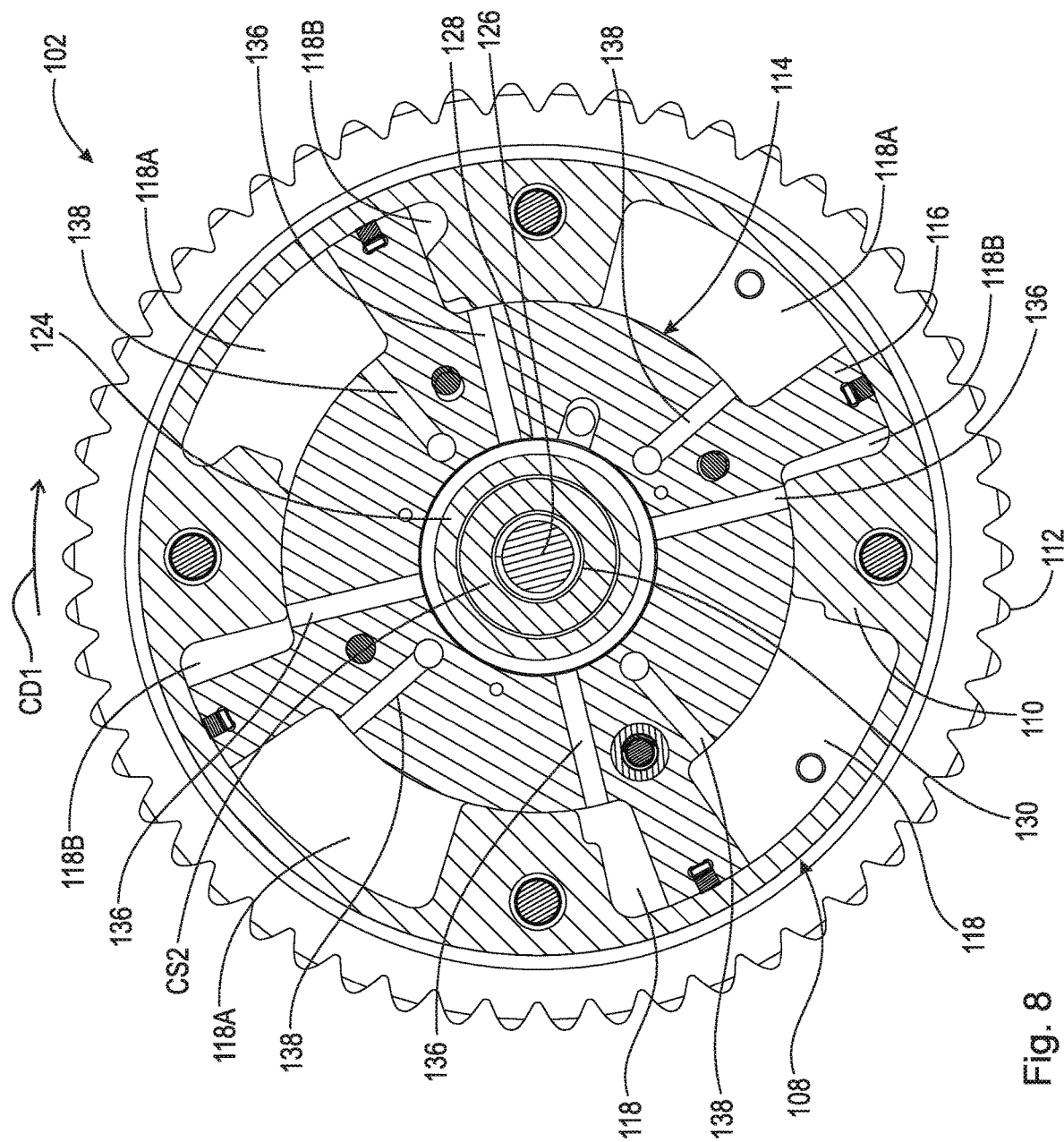
FIG. 8 is a cross-section view generally along line 8-8 in FIG. 2.

FIG. 8 is a cross-section view generally along line 8-8 in FIG. 2. The following should be viewed in light of FIGS. 1 through 8. Camshaft phaser assembly 100 includes: axis of rotation AR; hydraulic camshaft phaser 102; electric camshaft phaser 104; and connection plate 106. Hydraulic camshaft phaser 102 includes: stator 108 including radially inwardly extending protrusions 110; input gear 112 non-rotatably connected to stator 108 and arranged to receive rotational torque; and rotor 114. Rotor 114 includes radially outwardly extending protrusions 116 and is arranged to be non-rotatably connected to camshaft CS1. Protrusions 110 and 116 are circumferentially interleaved. That is, protrusions 110 and 116 alternate in circumferential direction CD1. Hydraulic camshaft phaser 102 includes chambers 118 formed at least in part by protrusions 110 and protrusions 116.

Electric camshaft phaser 104 includes: input 120; and output gear 122 arranged to be non-rotatably connected to camshaft CS2 concentric with camshaft CS1. At least a portion of camshaft CS2 is disposed within camshaft CS1. Connection plate 106 is non-rotatably connected to stator 108 and input 120. Thus, torque received by stator 108 is transmitted directly to input 120. Rotor 114 and output gear 122 are rotatable with respect to each other about axis AR. Thus, circumferential positions of camshaft CS1 and camshaft CS2 are independently selectable by rotating rotor 114 and output gear 122, respectively, with respect to stator 108. By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required.

In an example embodiment, electric camshaft phaser 104 is arranged to connect to output shaft OS of electric motor EM. Electric motor EM and output shaft OS are schematically represented in FIG. 2. In an example embodiment, camshaft phaser assembly 100 includes electric motor EM and electric camshaft phaser 104 is connected to output shaft OS of electric motor EM. Electric camshaft phaser 104 is axially disposed between electric motor EM and hydraulic camshaft phaser 102.

Assembly 100 includes hollow bolt 124 and bolt 126. Bolt 124 is arranged to non rotatably connect rotor 114 to camshaft CS1. Bolt 126 is arranged to non-rotatably connect output gear 122 to camshaft CS2. At least a portion of bolt 126 is disposed within bolt 124. In an example embodiment, bolt 126 extends past bolt 124 in opposite axial directions AD1 and AD2, parallel to axis AR. Direction AD1 is from motor EM toward phasers 102 and 104; or alternately stated, from phaser 104 toward phaser 102. Assembly 100 includes channel 128 and channel 130.

Channel 128 is: bounded at least in part by bolt 124 and rotor 114; and arranged to transmit fluid F1 to and from hydraulic camshaft phaser 102. For example: a portion of channel 128 is bounded in radially outer direction RD1, orthogonal to axis AR by rotor 114; and channel 128 is bounded in radially inner direction RD2, orthogonal to axis AR, by bolt 124. Channel 130 is: bounded at least in part by bolt 126 and electric camshaft phaser 104; and arranged to transmit fluid F2 to electric camshaft phaser 104. For example, channel 130 is bounded in radial direction RD2 by bolt 126 and in axial direction AD2, by phaser 104. Fluid F2 is arranged to lubricate electric camshaft phaser 104.

Channel 128 has length 132 in axial direction AD1. Channel 130 has a length 134 in axial direction AD1. Length 134 is greater than length 132. Channel 130 extends past channel 128 in axial direction AD1 and in axial direction AD2.

Chambers 118 include pairs of chambers 118. Each pair of chambers 118 includes an advance chamber 118A and a retard chambers 118B. Bolt 124 is arranged to non-rotatably connect rotor 114 to journal bearing JB and camshaft CS1. In an example embodiment, bearing JB includes through-bores TB1 open to channel 128. Rotor 114 includes through-bores 136 connecting channel 128 with chambers 118B. In an example embodiment, bearing JB includes through-bores TB2, and rotor 114 includes through-bores 138 connecting through-bores TB2 to chambers 118A. Through-bores 138 are arranged to transmit fluid F3 to and from chambers 118A. Fluids F1 and F3 are arranged to rotate rotor 114 with respect to stator 108. In an example embodiment (not shown), through-bores 136 open to chambers 118A and through-bores 138 open to chambers 118B. In general, a reference character "[digit][digit][digit][letter]" designates a specific example of an element labeled as "[digit][digit][digit]." For example, a chamber 118A is a specific example from among chambers 118.

By "through-bore" in a component, we mean that the through-bore is wholly enclosed by the component and includes a first end open to an exterior of the component and a second end open to the exterior of the component. The through-bore can be a single segment in a straight line, or can be two or more connected segments at angles with respect to each other. For example: through-bore 136 is wholly enclosed by rotor 114; and each end of through-bore 136 is open to the exterior surface of rotor 114. For example: through-bore 138 is wholly enclosed by rotor 114; each end of through-bore 138 is open to the exterior surface of rotor 114; and through-bore 138 has two segments at an angle to each other.

Bearing JB includes through-bores TB3 in fluid communication with channel 130. Camshaft CS1 includes through-bores TB4. Camshaft CS2 includes through-bores TB5. Through-bores TB4 connect through-bores TB3 and through-bores TB5. Through-bores TB5 connect through-bores TB4 and channel 130. By "fluid communication" between two components, we mean that a fluid flow path exists between the two components. That is, fluid is able to flow between the two components.

In an example embodiment: input 120 includes at least one notch 140; and connection plate 106 includes annular body portion 142 fixedly secured to stator 108, central opening 144 bounded by annular body portion 142 and through which axis of rotation AR passes, at least one protrusion 146 extending from annular body portion 142 in axial direction AD2 and including a portion disposed in notch 140. In an example embodiment: input 120 includes multiple notches 140; and plate 106 includes multiple protrusions 146. Plate 106 can be fixed to stator 108 by any means known in the art, for example by bolts 148. In an example embodiment, plate 106 is not fixedly connected to input 120. For example, protrusion 146 is disposed in notch 140, but is not axially fixed to input 120 and protrusion 146 can be axially inserted in and withdrawn from notch 140, facilitating fabrication of assembly 100.

Hydraulic phaser 102 includes target wheel 150 non-rotatably connected to rotor 114, for example by bolt 124. As is known in the art, wheel 150 is arranged to provide information regarding a rotational position of rotor 114. In an example embodiment, wheel 150 includes slots 152 and protrusions 146 passes through slots 152.

Electric camshaft phaser includes harmonic drive unit 154 with: elliptical wave generator 156; and flexible gear 158 engaged with generator 156 and non-rotatably connected to input 120. Output gear 122 includes teeth 160 and flexible gear 158 includes teeth 162. Some, but less than all, of teeth 162 are meshed with teeth 160. There are fewer teeth 160 than teeth 162.

Output shaft OS is, or is arranged to, non-rotatably connect to generator 156. When motor EM and output shaft OS rotate wave generator 156 at a first speed, a particular circumferential position of camshaft CS2 with respect to stator 108 and input 120 is maintained. When motor EM and output shaft OS rotate wave generator 156 at a second speed, less than the first speed, camshaft CS2 rotates, with respect to stator 108 and input 120, in direction CD2 (camshaft CS2 is retarded). When motor EM and output shaft OS rotate wave generator 156 at a third speed, greater than the first speed, camshaft CS2 rotates, with respect to stator 108 and input 120 in circumferential direction CD1 opposite direction CD2 (camshaft CS2 is advanced).

To rotate rotor 114 and camshaft CS1 with respect to stator 108 in direction CD1 (advance camshaft CS1): pressure of fluid F3 is increased; fluid F1 flows into chambers 118A; and fluid F1 flows out of chambers 118B. To rotate rotor 114 and camshaft CS1 with respect to stator 108 in direction CD2 (retard camshaft CS1): pressure of fluid F1 is increased; fluid F1 flows into chambers 118B; and fluid F3 flows out of chambers 118A.

Hydraulic camshaft phaser includes bias spring 176. In an example embodiment, stator 108, input gear 112, and connection plate 106 are non-rotatably connected by bolts 148.

Supplying adequate fluid pressure to a hydraulic camshaft phaser in a dual camshaft phaser assembly is a problem. For example, high pressure for fluids F1 and F3 are important for proper operation of phaser 102, in particular, for timely and accurately advancing and retarding camshaft CS1. In contrast, pressure for fluid F2, lubricating phaser 104, is not as critical. Assembly 100 alleviates the problem of inadequate fluid pressure by replacing a hydraulic camshaft phaser furthest from a source of fluid for assembly (via journal bearing JB) with electric camshaft phaser 104. Thus, by shortening the lengths of flow paths to chambers 118 with respect to a flow path to phaser 104 (for example, length 134 is considerably greater than length 132), the fluid requirements for phaser 104 are satisfied while greater pressure for fluids F1 and F3 are enabled.

Connection plate 106 provides a robust connection of stator 108 and input 120, to ensure that the advancing and retarding of camshaft CS2 are properly executed with respect to stator 108.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
CS1 camshaft
CS2 camshaft
EM electric motor
F1 fluid
F2 fluid
F3 fluid
OS output shaft, motor EM
RD1 radial direction
RD2 radial direction
TB1 through-bore, journal bearing
TB2 through-bore, journal bearing
TB3 through-bore, journal bearing
TB4 through-bore, camshaft CS1
TB5 through-bore, camshaft CS2
100 camshaft phaser assembly
102 hydraulic camshaft phaser
104 electric camshaft phaser
106 connection plate
108 stator
110 radially inwardly extending protrusion, stator
112 input gear, hydraulic camshaft phaser
114 rotor
116 radially outwardly extending protrusion, rotor
118 chamber, hydraulic camshaft phaser
118A chamber
118B chamber
120 input, electric camshaft phaser
122 output gear, electric camshaft phaser
124 bolt
126 bolt
128 channel
130 channel
132 axial length
134 axial length
136 through-bore
138 through-bore
140 notch, input
142 annular body portion, connection plate
144 central opening, connection plate
146 protrusion, connection plate
148 bolt
150 target wheel
152 slot, target wheel
154 harmonic drive unit
156 elliptical wave generator
158 flexible gear
160 teeth, output gear 162 teeth, flexible gear
164 flow path
166 flow path
168 flow path
170 length, flow path 164
172 length, flow path 166
174 length, flow path 168
176 bias spring

The invention claimed is:
1. A camshaft phaser assembly, comprising:
an axis of rotation;
a hydraulic camshaft phaser including:
  a stator arranged to receive rotational torque and including a plurality of radially inwardly extending protrusions;
  a rotor arranged to be non-rotatably connected to a first camshaft and including a plurality of radially outwardly extending protrusions circumferentially interleaved with the plurality of radially inwardly extending protrusions; and,
  a plurality of chambers bounded at least in part by the plurality of radially inwardly extending protrusions and the plurality of radially outwardly extending protrusions;
an electric camshaft phaser including:
  an output gear arranged to be non-rotatably connected to a second camshaft located concentrically within the first camshaft; and,
  an input non-rotatably connected to the stator, wherein the rotor and the output gear are rotatable with respect to each other about the axis of rotation; and,
a connection plate non-rotatably connecting the input and the stator.
2. The camshaft phaser assembly of claim 1, wherein:
the input includes a notch; and,
the connection plate includes:
  an annular body portion fixedly secured to the stator;
  a central opening bounded by the annular body portion and through which the axis of rotation passes; and,
  a protrusion:
    extending from the annular body portion in an axial direction; and,
    including a portion disposed in the notch.
3. The camshaft phases assembly of claim 2, further comprising:
a target wheel:
  non-rotatably connected to the rotor; and,
  arranged to provide information regarding a rotational position of the rotor, wherein the protrusion passes through the target wheel.
4. The camshaft phaser assembly of claim 1,
further comprising an electric motor including an output shaft connected to the electric camshaft phaser and wherein the electric camshaft phaser is axially disposed between the electric motor and the hydraulic camshaft phaser; or,
wherein the electric camshaft phaser is arranged to connect to an output shaft of an electric motor, and the electric camshaft phaser is axially disposed between the electric motor and the hydraulic camshaft phaser.
5. The camshaft phaser assembly of claim 4, wherein:
the electric camshaft phaser includes a harmonic drive unit; and,
the harmonic drive unit is:
  connected to the output shaft, the input, and the output gear; and,
  is arranged to circumferentially shift the output gear with respect to the input.
6. The camshaft phaser assembly of claim 1, further comprising:
a first bolt arranged to non-rotatably connect the rotor to the first camshaft;
a second bolt arranged to non-rotatably connect the output gear to the second camshaft;
a first channel:
  bounded at least in part by the first bolt and the rotor; and,
  arranged to transmit first fluid to and from the hydraulic camshaft phaser; and,
a second channel:
  bounded at least in part by the second bolt; and,
  arranged to transmit second fluid to the electric camshaft phaser.
7. The camshaft phaser assembly of claim 6, wherein:
the first fluid is arranged to rotate the rotor with respect to the stator; and,
the second fluid is arranged to lubricate the electric camshaft phaser.
8. The camshaft phaser assembly of claim 6, wherein:
the first channel has a first length in an axial direction;
the second channel has a second length in the axial direction; and,
the second length is greater than the first length.
9. The camshaft phaser assembly of claim 6, wherein:
the second channel extends past the first channel in a first axial direction; or,
the second channel extends past the first channel the first axial direction and in a second axial direction, opposite the first axial direction.
10. The camshaft phaser assembly of claim 6, wherein:
the first bolt is arranged to non-rotatably connect the rotor to a journal bearing;
the journal bearing includes a first through-bore open to the first channel; and,
the rotor includes a second through-bore connecting the first channel with a first chamber included in the plurality of chambers.
11. The camshaft phaser assembly of claim 10, wherein:
the journal bearing includes a third through-bore;
the rotor includes a fourth through-bore connecting the third through-bore to a second chamber included in the plurality of chambers; and,
the fourth through-bore is not in fluid communication with the first channel.
12. The camshaft phaser assembly of claim 6, wherein:
the first bolt is arranged to non-rotatably connect the rotor to a journal bearing; and,
the journal bearing includes a first through-bore in fluid communication with the second channel.
13. The camshaft phaser assembly of claim 12, wherein:
the first camshaft includes a second through-bore;
the second camshaft includes a third through-bore;
the second through-bore connects the first through-bore and the third through-bore; and,
the third through-bore connects the second through-bore and the second channel.
14. The camshaft phaser assembly of claim 6, wherein the second bolt includes at least a portion disposed within the first bolt.
15. The camshaft phaser assembly of claim 6, wherein:
the second bolt extends past the first bolt in a first axial direction; or, the second bolt extends past the first bolt the first axial direction and in a second axial direction, opposite the first axial direction.

16. A camshaft phaser assembly, comprising:
an axis of rotation;
a hydraulic camshaft phaser including:
  a stator arranged to receive rotational torque and including a plurality of radially inwardly extending protrusions;
  a rotor including a plurality of radially outwardly extending protrusions circumferentially interleaved with the plurality of radially inwardly extending protrusions; and,
  a plurality of chambers bounded at least in part by the plurality of radially inwardly extending protrusions and the plurality of radially outwardly extending protrusions;
an electric camshaft phaser including:
  an output gear; and,
  an input including a notch;
a first bolt arranged to non-rotatably connect the rotor to a first camshaft;
a second bolt arranged to non-rotatably connect the output gear to a second camshaft, the second camshaft concentric with the first camshaft; and,
a connection plate including:
  an annular body portion fixedly secured to the stator;
  a central opening bounded by the annular body portion and through which the axis of rotation passes; and,
  a protrusion:
    extending from the annular body portion in an axial direction; and,
    including a portion disposed in the notch, wherein the rotor and the output gear are rotatable with respect to each other about the axis of rotation.

17. The camshaft phaser assembly of claim 16, further comprising:
a first channel:
  bounded at least in part by the first bolt and the rotor;
  with a first length in the axial direction and,
  in fluid communication with the hydraulic camshaft phaser; and,
a second channel:
  bounded at least in part by the second bolt;
  with a second length in the axial direction; and,
  in fluid communication with the electric camshaft phaser, wherein the second length is greater than the first length.

18. A camshaft phaser assembly, comprising:
an axis of rotation;
a hydraulic camshaft phaser including:
  a stator arranged to receive rotational torque and including a plurality of radially inwardly extending protrusions;
  a rotor including a plurality of radially outwardly extending protrusions circumferentially interleaved with the plurality of radially inwardly extending protrusions; and,
  a plurality of chambers bounded at least in part by the plurality of radially inwardly extending protrusions and the plurality of radially outwardly extending protrusions;
an electric camshaft phaser including:
  an output gear; and,
  an input;
a first bolt arranged to non-rotatably connect the rotor to a first camshaft;
a second bolt arranged to non-rotatably connect the output gear to a second camshaft, the second camshaft concentric with the first camshaft;
a connection plate non-rotatably connected to the stator and to the input;
a first channel:
  bounded at least in part by the first bolt and the rotor; and,
  in fluid communication with a chamber included in the plurality of chambers; and,
a second channel:
  bounded at least in part by the second bolt;
  in fluid communication with the electric camshaft phaser; and,
  extending past the first channel in:
    a first axial direction; and,
    a second axial direction, opposite the first axial direction, wherein the rotor and the output gear are rotatable with respect to each other about the axis of rotation.

19. The camshaft phaser assembly of claim 18, wherein the connection plate is not fixedly connected to the input.

20. The camshaft phaser assembly of claim 18, wherein:
the input includes a notch; and,
the connection plate includes:
  an annular body portion fixedly secured to the stator;
  a central opening bounded by the annular body portion and through which the axis of rotation passes; and,
  a protrusion:
    extending from the annular body portion in the first axial direction; and,
    including a portion disposed in the notch.

* * * * *